United States Patent
Lee

(10) Patent No.: US 9,438,717 B2
(45) Date of Patent: Sep. 6, 2016

(54) METHOD OF DISPLAYING CONTACT INFORMATION, METHOD OF HANDLING LOST CALL AND ELECTRONIC APPARATUS USING THE SAME

(71) Applicant: HTC Corporation, Taoyuan County (TW)

(72) Inventor: Chi-Min Lee, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/449,167

(22) Filed: Aug. 1, 2014

(65) Prior Publication Data

US 2015/0079953 A1    Mar. 19, 2015

Related U.S. Application Data

(60) Provisional application No. 61/864,649, filed on Aug. 12, 2013, provisional application No. 61/914,347, filed on Dec. 10, 2013.

(51) Int. Cl.
| | |
|---|---|
| *H04W 24/00* | (2009.01) |
| *H04M 1/725* | (2006.01) |
| *H04M 1/2745* | (2006.01) |

(52) U.S. Cl.
CPC ... *H04M 1/72519* (2013.01); *H04M 1/274558* (2013.01)

(58) Field of Classification Search
None
See application file for complete search history.

(56) References Cited

U.S. PATENT DOCUMENTS

| | | | |
|---|---|---|---|
| 2006/0135142 A1 | 6/2006 | Repka | |
| 2009/0267910 A1* | 10/2009 | Tsuei | G06F 3/0485 345/173 |
| 2013/0002441 A1* | 1/2013 | Khan | H04L 67/306 340/636.1 |

FOREIGN PATENT DOCUMENTS

| | | |
|---|---|---|
| CN | 102263855 | 11/2011 |
| EP | 1603312 | 12/2005 |
| EP | 2237533 | 10/2010 |

OTHER PUBLICATIONS

"Office Action of European Counterpart Application", issued on Jan. 23, 2015, p. 1-p. 4.
"Office Action of European Counterpart Application", issued on Feb. 6, 2015, p. 1-p. 6.
Office Action of Taiwan Counterpart Application, issued on Jun. 21, 2016, p. 1-p. 7.

* cited by examiner

*Primary Examiner* — Martin Mushambo
(74) *Attorney, Agent, or Firm* — Jiang Chyun IP Office

(57) ABSTRACT

The present application discloses a method for displaying contact information, a method of handling a lost call, and an electronic apparatus using the same method of displaying contact information. The method of displaying contact information is applicable to an electronic apparatus. The method of displaying contact information would include at least but not limited to detecting inputted number in a dialer; displaying a contact in response to the inputted number; and displaying at least one of one or more indicators corresponding to the contact, wherein the indicator indicates a voice call availability corresponding to the contact.

9 Claims, 4 Drawing Sheets

METHOD OF DISPLAYING CONTACT INFORMATION, METHOD OF HANDLING LOST CALL AND ELECTRONIC APPARATUS USING THE SAME

CROSS-REFERENCE TO RELATED APPLICATION

This application claims the priority benefits of U.S. provisional application Ser. No. 61/864,649, filed on Aug. 12, 2013, and U.S. provisional application Ser. No. 61/914,347, filed on Dec. 10, 2013. The entirety of the above-mentioned patent applications is hereby incorporated by reference herein and made a part of this specification.

BACKGROUND

1. Field of the Invention

The application relates to a method of displaying contact information, a method of handling a lost call, and an electronic apparatus using the same method of displaying contact information.

2. Description of Related Art

Along with recent advancements of communication technologies, mobile electronic devices (such as smartphone, tablets, etc.) have become an integral part of people's daily lives. By carrying these devices to places everywhere such as meetings, offices, social situations, and so forth, wireless communication could be accessible. However, voice calls which are incoming to mobile devices can be disruptive under some circumstances.

SUMMARY

In some situations, for example, if a user is sleeping or is in a meeting, the user may not want to be disrupted by incoming calls. Under these situations, users of these phones usually have to manually set their mobile devices to mute incoming calls or to turn off the mobile devices in advance.

In other situations, the mobile electronic device may not be suitable for receive incoming calls because of its condition. For example, the power status of the mobile electronic device could be getting low, or the signal strength of a nearby communication network of the mobile device is too weak to establish a call. Under these kind of situations, a user may not want to receive incoming calls. However, since incoming callers don't know the situations of a callee, callers may still inevitably disturb the callee even though no harm was intended. Therefore, a method and a device to alleviate the aforementioned problems could be needed.

Accordingly, the present application is directed to a method of displaying contact information and an electronic apparatus using the same to make a user more easily understand whether a contact is available to answer calls. Moreover, the present application is directed to a method for handling a lost call, and the method could effectively prevent users from simultaneously calling each other after a call between the a caller and a callee has been accidentally disrupted.

The present application provides a method of displaying contact information, applicable to a mobile electronic apparatus. The method would include at least but not limited to detecting inputted number in a dialer; displaying a contact in response to the inputted number; displaying at least one of one or more indicator corresponding to the contact, wherein the indicator would indicate a voice call availability corresponding to the contact.

The present application provides a computer-readable medium containing instructions for performing the aforementioned method of displaying contact information.

The present application provides a mobile electronic apparatus, which would include a storage unit, a display unit, and a processing unit. The storage unit would store a plurality of program codes. The processing unit would be coupled to the storage unit and the display unit, and configured for accessing the program codes to execute at least but not limited to detecting inputted number in a dialer; controlling the display unit to display a contact in response to the inputted number; controlling the display unit to display at least one of one or more indicators corresponding to the contact, wherein the indicator indicates a voice call availability corresponding to the contact.

In an example of the present application, each of the indicator has at least a first status and a second status, wherein the first status represents that the contact is available, and the second status represents that the contact is not available.

In an example of the present application, wherein the indicator comprises a contactability indicator, and the method would further include labelling the contactability indicator with a color according to a contactability corresponding to the other indicator.

In an example of the present application, the contactability has at least a first level, a second level, and a third level.

In an example of the present application, the labelling of the contactability indicator would include in response to all of the other indicator is the first status, labelling the contactability indicator with the color corresponding to the first level.

In an example of the present application, the indicator would include one or more of a battery level indicator, a calendar availability indicator, a local time indicator, a sound profile indicator, a roaming indicator, and a pocket mode indicator. Labelling the contactability indicator would include in response to one of the battery level indicator, the calendar availability indicator, the local time indicator, the sound profile indicator, the roaming indicator, and the pocket mode indicator is the second status, labelling the contactability indicator with the color corresponding to the second level.

In an example of the present application, the indicator would include a cellular communication signal indicator and labelling the contactability indicator would include in response to the cellular communication signal indicator is the second status, labelling the contactability indicator with the color corresponding to the third level.

The present application provides a method for handling a lost call, applicable to a first electronic apparatus. The method would include at least but not limited to in response to a call between the first electronic apparatus and a second electronic apparatus is not finished by being hanged up, determining whether the call is established by the first electronic apparatus, and in response to determining the call is established by the first electronic apparatus, generating a notification, wherein the notification is configured for preventing the first electronic apparatus and the second electronic apparatus from simultaneously calling each other.

The present application provides a computer-readable medium containing instructions for performing the aforementioned method for handling a lost call.

The present application provides a mobile electronic apparatus, which would include a storage unit, a display unit, and a processing unit. The storage unit would store a plurality of program codes. The processing unit would be coupled to the storage unit and the display unit, and configured for accessing the program codes to execute at least but not limited to in response to a call between the first electronic apparatus and a second electronic apparatus is not finished by being hanged up, determining whether the call is established by the first electronic apparatus, and in response to determining the call is established by the first electronic apparatus, generating a notification, wherein the notification is configured for preventing the first electronic apparatus and the second electronic apparatus from simultaneously calling each other.

In an example of the present application, wherein the notification comprises a first notification for suggesting establish another call with the second electronic apparatus.

In an example of the present application, wherein the notification comprises a button for been activated to establish the other call with the second electronic apparatus.

In an example of the present application, in response to determining the call is not established by the first electronic apparatus, generating a second notification for suggesting wait for the second electronic apparatus to establish the other call.

In an example of the present application, in response to detecting the first electronic apparatus initiating the other call with the second electronic apparatus before generating the second notification for suggesting wait for the second electronic apparatus to establish the other call, hanging up the other call.

Based on the above description, the examples of the present application would provide a method for displaying contact information and an electronic apparatus using the same method. The proposed method for displaying contact information could display some indicators, which would show the voice availability of the contact, while the user is inputting (i.e., dialing) numbers or characters in the dialer of the electronic apparatus. Furthermore, the examples of the present application provide a method for handling call lost. The method for handling call lost could generate a notification when the call between the first electronic apparatus and the second electronic apparatus is accidentally finished. With the notification, the users of the first and second electronic apparatus could accordingly determine whether to proactively establish a new call or passively wait for the new call.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
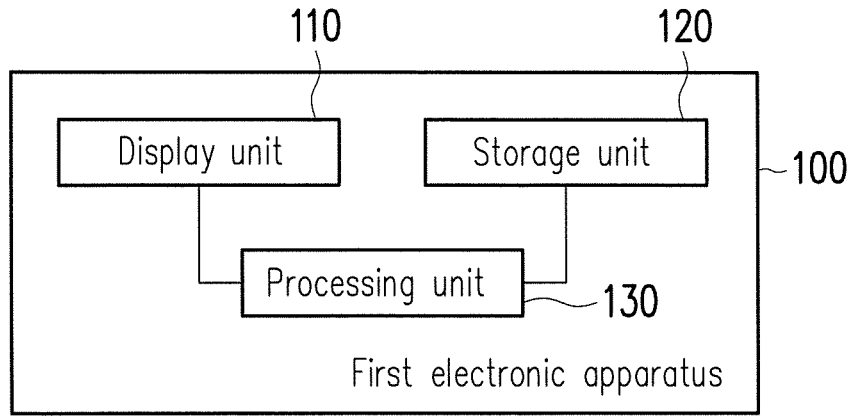
FIG. 1 is a schematic diagram illustrating a first electronic apparatus according to an example of the present application.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

FIG. 1 is a schematic diagram illustrating a first electronic apparatus according to an example of the present application. In the present example, a first electronic apparatus 100 would include at least but not limited to a storage unit 110, a display unit 120, and a processing unit 130. The first electronic apparatus 100 could be, for example, a portable electronic device, such as a cell phone, a smartphone, a personal digital assistant (PDA), a tablet, or the like, and the present application is not limited thereto. The storage unit 110 could be one or a combination of a stationary or mobile random access memory (RAM), read-only memory (ROM), flash memory, hard disk, or any other similar device, and which records a plurality of modules that can be executed by the processing unit 130. The display unit 120 could be a liquid crystal display (LCD), a plasma display, a vacuum fluorescent display, a light emitting diode display, a field emission display (FED), and/or other kind of suitable displays, or the electronic devices having the aforementioned displays, but the application is not limited thereto. In some examples, the display unit 120 would be implemented as a touch screen.

The processing unit 130 is coupled to the storage unit 110 and the display unit 120. The processing unit 130 is one or a combination of a central processing unit (CPU), a programmable general- or specific-purpose microprocessor, a digital signal processor (DSP), a programmable controller, application specific integrated circuits (ASIC), a programmable logic device (PLD), or any other similar device. The processing unit 130 is coupled to the storage unit 110. The processing unit 130 may access and execute the modules recorded in the storage unit 110 to execute a method for displaying contact information proposed in the present application, which would be described later.

In brief, the method for displaying contact information proposed in the present application could be implemented by executing a specific application (hereinafter "the first application") on the first electronic apparatus 100. The specific application could help the electronic apparatus 100 to retrieve the contact information of the user of a second electronic apparatus, which is also installed with the specific application (hereinafter "the second application"). The first application and the second application may be the same application or two different applications but provide the same function of displaying contact information of the present application. The first application and the second application may be applications having an independent contact list function, an independent contact card function, and/or an independent dialer function, or may be applications integrating with the original contact list function, contact card function, and/or dialer function and displaying the availability information in the original contact list user interface, contact card user interface, and/or dialer user interface. The communication between the first application and the second application is, for example, through a server. For example, the second application may collect information in the second electronic apparatus and transmit the collected information to a server, and then the server may transmit the collected information of the second electronic apparatus to the first application of the first electronic apparatus.

Figure 2:
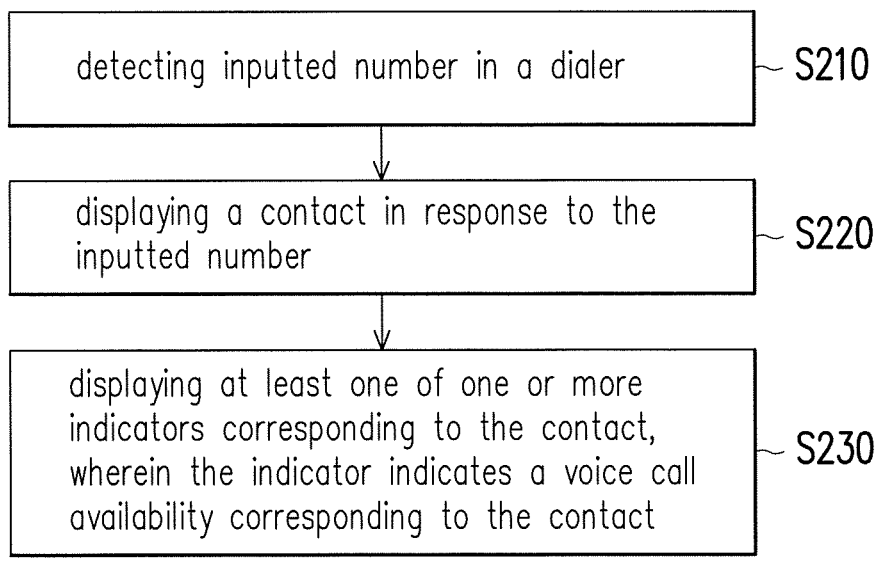
FIG. 2 is a flow chart illustrating a method for displaying contact information according to an example of the present application.

FIG. 2 is a flow chart illustrating a method of displaying contact information according to an example of the present application. In the present example, the steps illustrated in FIG. 2 could be applicable to the first electronic apparatus 100 of FIG. 1, but the application is not limited thereto. Below, the method for displaying contact information is described in detail with reference to various components of the first electronic apparatus 100.

In step S210, the processing unit 130 would detect inputted number in a dialer, for example the numerals 0 to 9 and the symbols # and *, in a dialer. In the present example, the dialer represents the dialing application of the electronic apparatus 100. Specifically, when the user of the first electronic apparatus 100 activates the dialer, the processing unit 130 may detect the (telephone) numbers that the user inputs through, for example, a touch screen with a dialing keypad, a hardware dialing keypad, or other kinds of keys or keypads with the function of inputting numbers of the first electronic apparatus 100. In other examples, the processing unit 130 could also detect the (telephone) numbers that the user vocally inputs to the microphone of the first electronic apparatus 100, but the application is not limited thereto.

In step S220, the processing unit 130 may control the display unit 110 to display a contact in response to the inputted number. For the convenience of description, the proposed method would be discussed under the assumption of handling one contact. However, people with ordinary skills in the art should understand that the proposed method could also be generalized to the scenarios of handling a plurality of contacts according to the similar mechanism.

In detail, along with each digit of the inputted numbers, the processing unit 130 could find out the contact whose parts of telephone numbers match the currently inputted numbers, and control the display unit 110 to display the contact. In other examples, in a regular dialing keypad, since the numbers could respectively corresponds to some certain characters (e.g., "2" corresponds to "abc", "3" corresponds to "def", and so on), the processing unit 130 could also find out the contact whose name (or other contact information) match the characters corresponding to the currently inputted numbers.

In step S230, the processing unit 130 may control the display unit 110 to display at least one of one or more indicators corresponding to the contact, wherein the indicator indicates a voice call availability corresponding to the contact. The at least one indicator may be, for example, a battery level indicator, a calendar availability indicator, a local time indicator, a sound profile indicator, a roaming indicator, a cellular communication signal indicator, but the application is not limited thereto.

In one example, it is assumed that the contact found in step S220 is the user of the aforementioned second electronic apparatus. Under this situation, the processing unit 130 could execute the first application installed on the first electronic apparatus 100 to retrieve the information related to the second electronic apparatus, such as the battery level, the local time, the sound profile, the roaming situation, the cellular communication signal status of the second electronic apparatus. In other examples, the processing unit 130 could also execute the first application to retrieve the information related to the contact, such as the calendar availability of the contact.

In some examples, the battery level may represent the current power status of the battery of the second electronic apparatus, such as battery high, battery low, or other levels, for example in a power saving mode. The local time may be the time of the location where the second electronic apparatus currently is. The sound profile may represent the current ringing mode of the second electronic apparatus, such as volume on mode, volume off mode, vibrating mode, silent mode (volume off and vibration off), etc. The roaming situation may represent whether the second electronic apparatus is currently roaming. The cellular communication signal status may represent the signal strength of the cellular communication network (e.g., a global system for cellular communication (GSM)) of the second electronic apparatus. The calendar availability may represent that whether the contact is in an event, for example in a meeting.

In the present application, the information related to the second electronic apparatus and the information related to the contact may be regarded as references for determining whether the contact is available to be called or whether the contact is able to hear a call, and hence would be generally referred to the contact information in the following discussions.

The aforementioned contact information could be provided by the second application installed on the second electronic apparatus. More specifically, the first application could interact with the second application to retrieve the aforementioned information.

In some examples, if the user of the first electronic apparatus 100 wants to use the first application to retrieve the contact information of the user of the second electronic apparatus (i.e., the contact found in step S220), the user may use the first application to invite the user of the second electronic apparatus through, for example, sending an invitation to the second application. In an example, the user may send the invitation in a user interface of the first application. In other example, the use may send the invitation from a contact list or a contact card, i.e. a page for displaying detailed information of the contact. As the user of the second electronic apparatus receives the invitation, the user of the second electronic apparatus may accordingly authorize the first application to retrieve information from the second application. On the other hand, the user of the second electronic apparatus could also ignore the invitation from the first application, such that the first application cannot retrieve any information from the second application. In other example, after the user of the second electronic apparatus authorize the first application to retrieve information from the second application. there may be a switch in the second application to enable or disable the sharing of the information to the first electronic apparatus.

For example, if the first application detects that the second electronic apparatus hasn't been installed with the second application, the processing unit 130 could execute the first application to send a message, such as an email, a short message service (SMS) message, an instant message (IM), to the second electronic apparatus. The message may contain a link to download the second application, such that the user of the second electronic apparatus could accordingly download the second application to the second electronic apparatus.

After retrieving the aforementioned contact information, the processing unit 130 could accordingly adjust the status of the corresponding indicators (e.g., the battery level indicator, the calendar availability indicator, the local time indicator, the sound profile indicator, the roaming indicator, the pocket mode indicator, the cellular communication signal indicator, etc.), such that the user of the first electronic apparatus 100 could determine whether the contact is available according to the indicators. In detail, each of the indicators may at least have a first status and a second status. The first status may represent that the contact is available, and the second status may represent that the contact is probably not available. For example, the first status and the second status of the indicator may be two different icons or may be the same icon with different colors. In other example, the indicator may be only displayed when the status of the second electronic apparatus is in a second status, such as indicators for indicating the second electronic apparatus is in an air plane mode, in a drive mode, etc. and indicator for notifying the user of the first electronic apparatus do not disturb the user of the second electronic apparatus.

For a first example, if the battery of the second electronic apparatus is high, the processing unit 130 could adjust the battery level indicator to be the first status. Therefore, the user of the first electronic apparatus 100 would understand that the power status of the second electronic apparatus is enough to receive calls. On the other hand, if the battery of the second electronic apparatus is low, the processing unit 130 could adjust the battery level indicator to be the second status. Under this situation, the user of the first electronic apparatus 100 would understand that the battery condition of the second electronic apparatus may not be enough to receive calls.

For a second example, if processing unit 130 detects that the contact is not in an event according to, for example, the schedule stored in the second electronic apparatus, the processing unit 130 could adjust the calendar availability indicator to be the first status. Therefore, the user of the first electronic apparatus 100 would understand that calling the contact would not interfere the event of the contact. On the other hand, if the processing unit 130 detects that the contact is currently in an event, the processing unit 130 could adjust the calendar availability indicator to be the second status. Under this situation, the user of the first electronic apparatus 100 would understand that it may be inappropriate to call the contact since the contact may be in a meeting.

For a third example, if the processing unit 130 detects that the local time of the second electronic apparatus is in the daytime, the processing unit 130 could adjust the local time indicator to be the first status. Therefore, the user of the first electronic apparatus 100 would understand that calling the contact is less probable to interfere, for example, the sleeping of the contact. On the other hand, if the processing unit 130 detects that the local time of the current location of the second electronic apparatus is in the late night, the processing unit 130 could adjust the local time indicator to be the second status. Under this situation, the user of the first electronic apparatus 100 would understand that it may be inappropriate to call the contact since the contact may be sleeping. In other example, the local time of the current location of the second electronic apparatus may be displayed in the contact list, the contact card, and/or in the dialer. In another example, the local weather condition the current location of the second electronic apparatus and/or the local city name of the current location of the second electronic apparatus may be displayed.

For a fourth example, if the processing unit 130 detects that the ringing mode of the second electronic apparatus is in the volume on mode or in the other modes wherein the ringtone volume is on, the processing unit 130 could adjust the sound profile indicator to be the first status. Therefore, the user of the first electronic apparatus 100 would understand that the contact is less probable to miss the call for not noticing the incoming call ringtone alert of the second electronic apparatus. On the other hand, if the processing unit 130 detects that the ringing mode of the second electronic apparatus is in the volume off mode, headset mode, the vibrating mode, the silent mode, or the other wherein the ringtone volume is off, the processing unit 130 could adjust the sound profile indicator to be the second status. Under this situation, the user of the first electronic apparatus 100 would understand that the contact may miss the call for not noticing the incoming call ringtone alert of the second electronic apparatus. In another mode, the processing unit 130 adjusts the sound profile indicator to be the second status only if the ringtone volume and vibration for the incoming call are both off.

For a fifth example, if the processing unit 130 detects that the second electronic apparatus is not roaming, the processing unit 130 could adjust the roaming indicator to be the first status (probably hiding the roaming indicator). Therefore, the user of the first electronic apparatus 100 would understand that calling the contact would not cost the contact lots of money for being roaming. On the other hand, if the processing unit 130 detects that the second electronic apparatus is roaming, the processing unit 130 could adjust the roaming indicator to be the second status. Under this situation, the user of the first electronic apparatus 100 would understand that calling the contact may cost the contact lots of money.

For a sixth example, the first electronic apparatus 100 further comprises one or more sensors, for example a proximity sensor, for determining whether the first electronic apparatus 100 is in a pocket. If the processing unit 130 determines that the first electronic apparatus 100 is not in a pocket according to the sensor, the processing unit 130 could adjust the pocket mode indicator to be the first status. If the processing unit 130 determines that the first electronic apparatus 100 is in a pocket according to the sensor, the processing unit 130 could adjust the pocket mode indicator to be the second status. Under this situation, the user of the first electronic apparatus 100 would understand that the contact may miss the call for not noticing the incoming call alert of the second electronic apparatus. In other examples, there may be more sensors and more indicators to detect and indicate whether the second electronic apparatus is in a bag, whether the second electronic apparatus is in a drive mode, i.e. the user is driving a car, etc. In another example, the drive mode indicator may be adjusted to second status in response to the contact switch the user interface of the second electronic apparatus from a normal operation mode to a car mode.

For a seventh example, if the processing unit 130 detects that the signal strength of the cellular communication network of the second electronic apparatus is strong, the processing unit 130 could adjust the cellular communication signal indicator to be the first status. Therefore, the user of the first electronic apparatus 100 would understand that the call with the contact would be stable. On the other hand, if the processing unit 130 detects that the signal strength of the cellular communication network of the second electronic apparatus is weak or the status is in a no service status, the processing unit 130 could adjust the cellular communication signal indicator to be the second status. In other example, if the cellular communication signal of the second electronic apparatus is in a no service status, the processing unit 130 could also adjust the cellular communication signal indicator to be the second status or to be another status. Under this situation, the user of the first electronic apparatus 100 would understand that the call with the contact may be intermittent. In other examples, when the second electronic apparatus is in a call, the processing unit 130 could also adjust the cellular communication signal indicator to be a third status. Furthermore, after the call of the second electronic apparatus is finished, a notification will be displayed in the first electronic apparatus to indicate that the contact of the second electronic apparatus is available now. Therefore, the user of the first electronic apparatus 100 could understand that the second electronic apparatus probably could not accept another call for being currently being in a call.

In brief, the method proposed in the present application could display some indicators, which show the voice availability of the contact, while the user is inputting (i.e., dialing) numbers or characters. More specifically, the proposed method displays the indicators for a contact in the dialer of the first electronic apparatus, instead of displaying the indicators in a regular contact list, which lists all of the contacts stored in the first electronic apparatus. Since most of the users are more used to directly use the dialer to find the contact they want to call, displaying the indicators in the dialer along with the contact information searched according to the inputted numbers of the user would be much more practical, useful, and instinct for the users to understand whether the contacts are available to be called, wherein the contact information of the searched contact displayed in the dialer may comprises, for example, the name, the image, the phone number, and/or the last call information corresponding to the phone number of the searched contact. In other example, the indicator may also be displayed in the contact list and/or the contact card.

In one example, if the user of the first electronic apparatus 100 has missed lots of calls (e.g., 10 calls) from a user of a third electronic apparatus, for example the number of the missed calls reaches a threshold number, the processing unit 130 could execute the first application installed on the first electronic apparatus 100 to send the aforementioned message to the third electronic apparatus to invite the user of the third electronic apparatus to download the specific application (i.e., the second application). After the second application has been installed on the third electronic apparatus, the user of the third electronic apparatus can easy know whether the user of the first electronic apparatus is available to be called and the probability for the user of the first electronic apparatus 100 to miss the calls from the user of the third electronic apparatus could be significantly reduced.

In other examples, the processing unit 130 could execute the first application to calculate the numbers of missed calls from the contacts according to the missed call information. Next, the processing unit 130 could respectively add an add/invite button near the contacts within the missed call list and/or within a contact list whose electronic apparatus is not installed with the specific application (i.e., the second application). When the user of the first electronic apparatus 100 presses one of the add/invite button, the processing unit 130 could send the message to the electronic apparatus of the contact corresponding to the pressed add/invite button. Therefore, the probability of the first electronic apparatus 100 to miss calls could be further reduced.

In some examples, the indicators could further include an instant messaging indicator for indicating status of instant messaging software. In detail, along with the development of network technologies, more and more users use instant message software to make calls, such as the voice over Internet protocol (VoIP) calls, and send instant messages. With the instant messaging indicator, the user of the electronic apparatus 100 could understand that whether the contact could be called through the VoIP mechanism or send instant messages. Specifically, if the processing unit 130 detects that the user of the second electronic apparatus is currently online on one of the instant message software, the processing unit 130 could adjust the instant messaging indicator to be the first status. Accordingly, the user of the electronic apparatus 100 would understand that it is allowed to make a VoIP call with the contact or send instant messages to the contact. On the other hand, if the processing unit 130 detects that the second electronic apparatus is not online on the instant messaging software, the processing unit 130 could adjust the instant messaging indicator to be the second status. In one example, there is only one instant message indicator for all of the instant messaging software, and if at least one of the all instant messaging software is currently online, the instant messaging indicator will be the first status; and if all of the instant messaging software are current offline, the instant messaging indicator will be second status. In another example, each instant messaging software has its corresponding instant messaging indicator. Under this situation, the user of the first electronic apparatus 100 would understand that it is not allowed to make a VoIP call and not allowed to send instant messages to the user of the second electronic apparatus through the instant message software.

In some examples, since the quality of the VoIP calls is highly related to the signal strength of wireless networks (e.g., the wireless fidelity (Wi-Fi)), the indicators could further include a wireless network indicator, which indicates the user of the first electronic apparatus 100 that whether the quality of the wireless network of the second electronic apparatus is suitable to receive a VoIP call if the cellular communication network is not available for the second electronic apparatus.

In other examples, the processing unit 130 could further simultaneously consider the statuses of all of the indicators and accordingly label the indicators with one color. In another example, there may be another one contactability indicator and the processing unit 130 could simultaneously consider the statuses of all of the indicators and accordingly label the additional indicator with one color, and/or label the name and/or the image of the contact with the color. Consequently, the user could easily understand whether the contact is available to answer the call according to the labelled color without respectively checking the statuses of each of the indicators.

Figure 3:
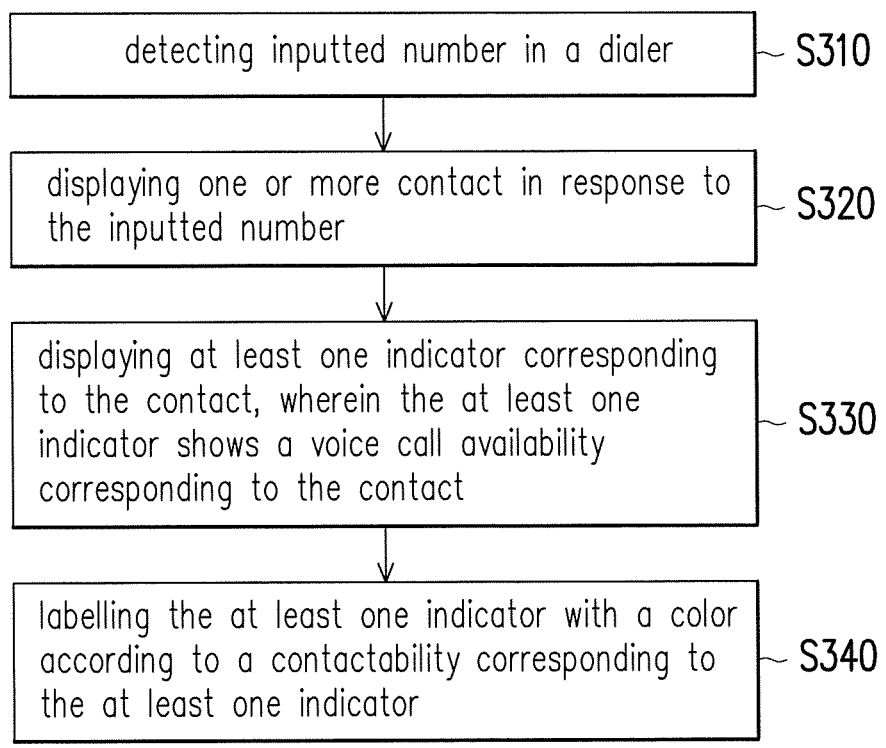
FIG. 3 is a flow chart illustrating a method for displaying contact information according to an example of the present application.

FIG. 3 is a flow chart illustrating a method for displaying contact information according to an example of the present application. In the present example, the steps illustrated in FIG. 3 could be applicable to the first electronic apparatus 100 of FIG. 1, but the application is not limited thereto. Below, the method for displaying contact information is described in detail with reference to various components of the first electronic apparatus 100.

In step S310, the processing unit 130 would detect inputted number in a dialer. In step S320, the processing unit 130 may control the display unit 110 to displaying one or more contact in response to the inputted number. In step S330, the processing unit 130 may control the display unit 110 to display at least one indicator corresponding to the contact, wherein the at least one indicator shows a voice call availability corresponding to the contact. The details of steps S310-S330 could be referred to steps S210-S230, which would not be repeated herein.

In step S340, the processing unit 130 would label the at least one indicator with a color according to a contactability corresponding to the at least one indicator. In the present example, the contactability has, for example, a first level, a second level, and a third level, but the present application is not limited thereto. When the contactability is the first level, it may represent that the contact is available. When the contactability is the second level, it may represent that the contact may not be available, for example, the power status of the second electronic apparatus may be insufficient, the contact may not be able to notice the incoming call alert, the contact is in a meeting, or there is time difference, etc. When the contactability is the third level, it may represent that the contact is not available. In other example, there may be more levels to indicate different status of the availability of the contact.

In one example, when all of the indicators are the first status, the processing unit 130 could label the indicators with the color corresponding to the first level. In the present example, the color corresponding to the first level could be green. In other example, there may be an additional contactability indicator labelled with the color, for example green, and/or the name and/or the image of the contact may be labelled with the green color. In another example, instead of the other indicators, only the contactability indicator is labelled with the green color. Therefore, when the user of the first electronic apparatus 100 observes that the indicators corresponding to the contact are green, the user would understand that the contact is available and convenient to answer the call and less probable to miss a call.

In another example, when one of the indicators comprising one or more of the battery level indicator, the calendar availability indicator, the local time indicator, the sound profile indicator, the roaming indicator, and the pocket mode indicator is the second status, the processing unit 130 could label the indicators with the color corresponding to the second level. In the present example, the color corresponding to the first level could be orange. Also, in another example, there may be an additional contactability indicator and the contactability indicator and/or the name and/or image of the contact be labelled with the orange color. Therefore, when the user of the first electronic apparatus 100 observes that the indicators corresponding to the contact are orange, the user would understand that the contact may not be able to the call for some reasons, such as being in a meeting, not noticing the incoming call alert, sleeping, low battery, etc.

In yet another example, when the cellular communication signal indicator is the second status (or the third status), the processing unit 130 could label the indicators with the color corresponding to the third level. In the present example, the color corresponding to the first level could be red. Also, in another example, there may be an additional contactability indicator and the contactability indicator and/or the name and/or image of the contact be labelled with the red color. Therefore, when the user of the first electronic apparatus 100 observes that the indicators corresponding to the contact are red, the user would understand that the contact is not available. Specifically, since the quality of the cellular communication signal is crucial for making calls, when the signal strength of the cellular communication network of the second electronic apparatus is not enough to receive a call, the processing unit 130 could accordingly label the indicators with the red. Therefore, the user of the first electronic apparatus 100 would understand that the signal strength of the cellular communication network of the second electronic apparatus is not suitable to receive a call.

In some other examples, the contactability may further have a fourth level, which could be represented by the grey. When the contactability is the fourth level, it may represent that the voice call availability of the contact is unknown. For example, when the user of the first electronic apparatus 100 is not authorized to interact with the second application installed on the second electronic apparatus. For another example, the second electronic apparatus is not connect with the sever, the second electronic apparatus is currently turned off, the running of the second application on the second electronic apparatus is stopped, the user is log out of the second application, etc., but the present application is not limited thereto. Also, in another example, there may be an additional contactability indicator and the contactability indicator and/or the name and/or image of the contact be labelled with the gray color.

Therefore, by labeling the indicators with the color corresponding to different levels of the contactability, the method proposed in the present application could further enhance the user experience of the users.

Figure 4:
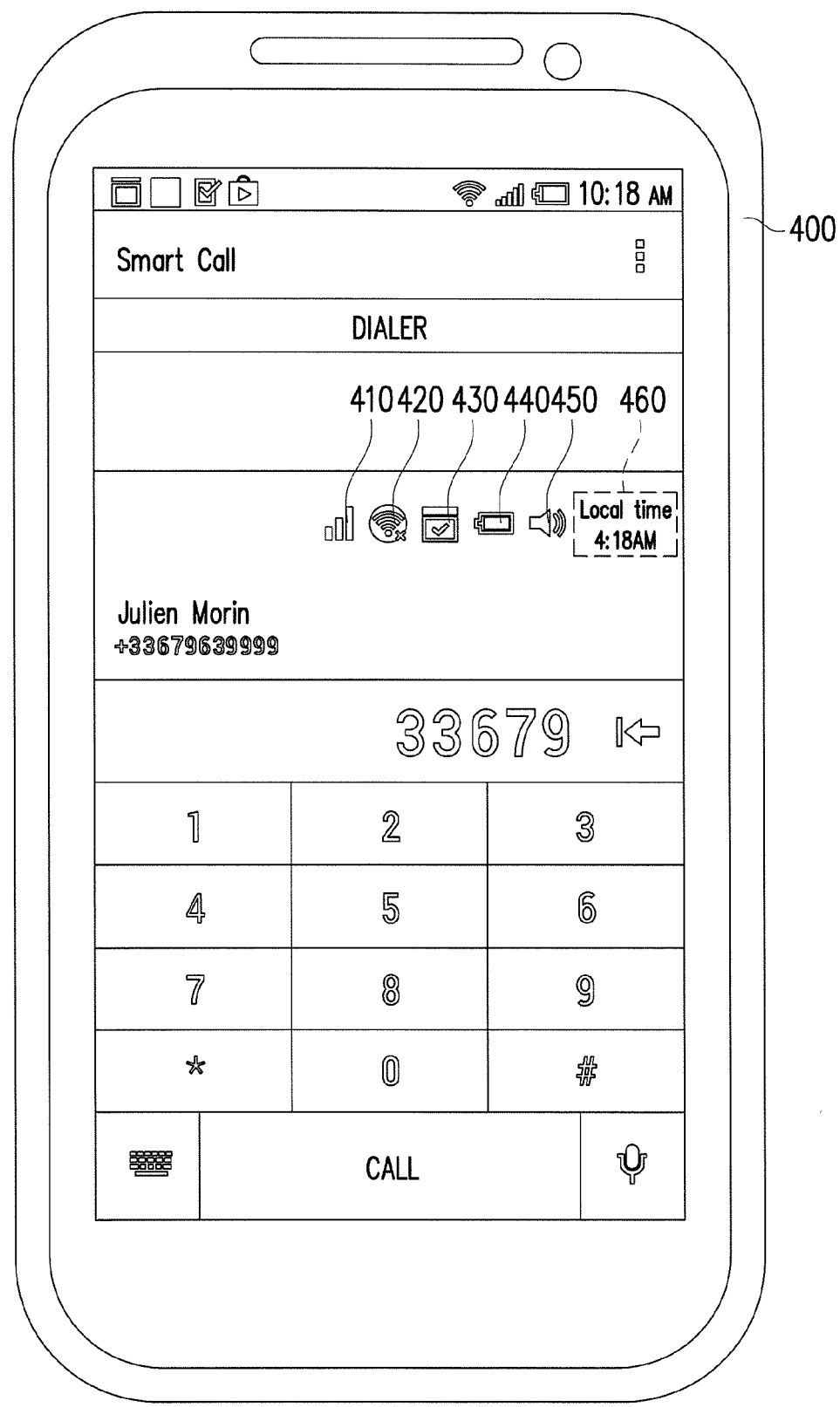
FIG. 4 is a schematic diagram of a demonstration of implementing the method of FIG. 2 and FIG. 3.

FIG. 4 is a schematic diagram of a demonstration of implementing the method of FIG. 2 and FIG. 3. In the present example, it is assumed that the user of a first electronic apparatus 400 has inputted the numbers "33679" to the dialer of the first electronic apparatus 400. Therefore, the first electronic apparatus 400 could display the contact (e.g., "Julien Morin") in response to the numbers "33679".

Meanwhile, the first electronic apparatus 400 could display indicators 410-460. The indicator 410 may be the cellular communication signal indicator, which represent that the signal strength of the cellular communication network of the second electronic apparatus is strong. The indicator 420 may be the wireless network indicator, which represents that the quality of the wireless network of the second electronic apparatus is not suitable to receive a VoIP call. The indicator 430 may be the calendar availability indicator, which represents that the user of the second electronic apparatus is not in a meeting. The indicator 440 may be the battery level indicator, which represents that the power status of the second electronic apparatus is enough to receive a call. The indicator 450 may be the sound profile indicator, which represent the ringtone mode of the second electronic apparatus is currently in a volume on mode or in the other modes wherein the ringtone volume is on, and hence the user of the second electronic apparatus may be able to notice the incoming call alert through the ringtone. The indicator 460 may be the local time indicator, which represents that the time of the second electronic apparatus is 4:18 AM.

As mentioned in previous examples, the user of the first electronic apparatus 400 could understand that whether "Julien Morin" is available to be called according to the displayed indicators 410-460.

In some examples, after the first electronic apparatus 100 successfully establishes a call with the second electronic apparatus, the call may still be accidentally disconnected (i.e., call drop) for some reasons, such as unstable cellular communication signals, for example GSM signals. Under this situation, the users of the first electronic apparatus 100 and the second electronic apparatus are highly probable to simultaneously try to call each other, such that the first electronic apparatus 100 and the second electronic apparatus cannot establish another call for being busy at the same time. To handling this problem, the present application further propose a method for handling call lost, which would be introduced hereinafter. Similar to the aforementioned examples, the method of the FIG. 5 could also be implemented by the first application executed by the processing unit 130.

Figures 5, 6:
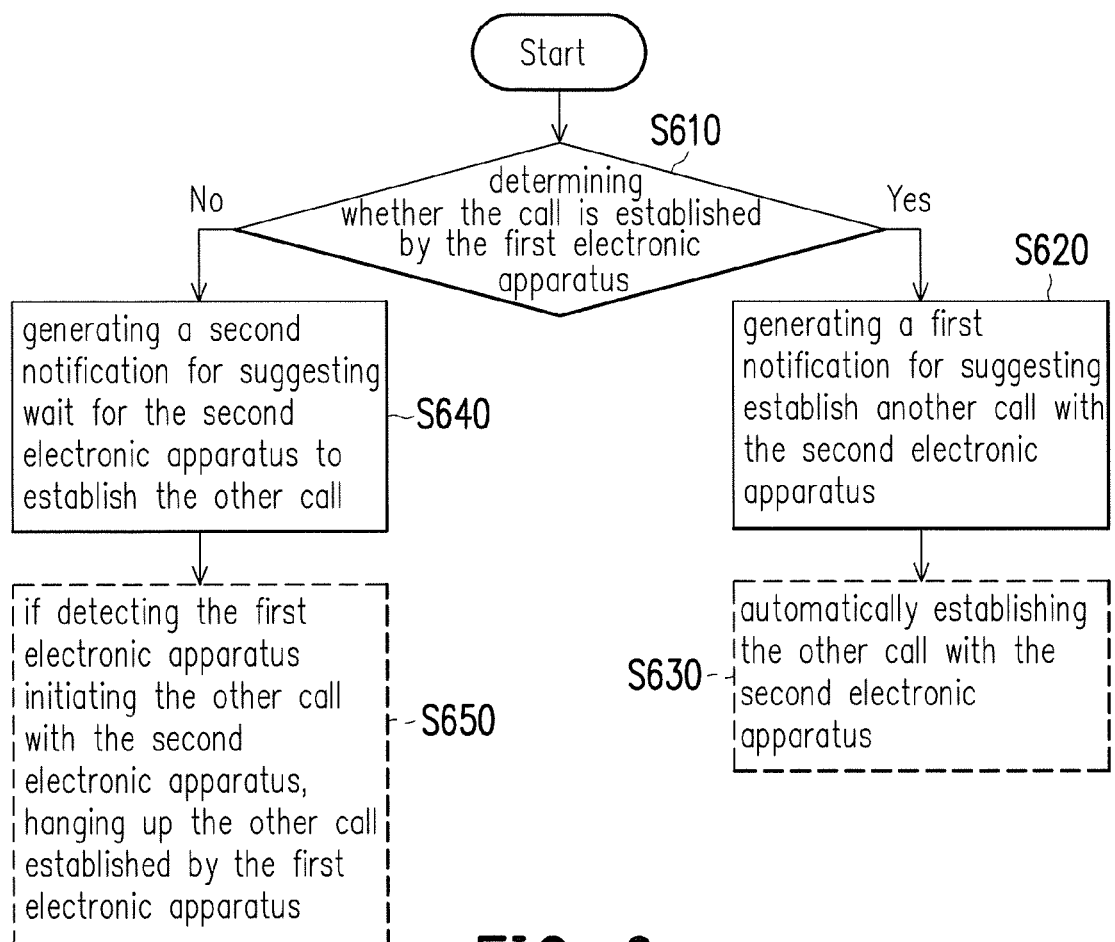
FIG. 5 is a method for handling call lost according to an example of the present application.
FIG. 6 is a method for handling call lost according to FIG. 5.

FIG. 5 is a method for handling call lost according to an example of the present application. In the present example, the steps illustrated in FIG. 5 could be applicable to the first electronic apparatus 100 of FIG. 1, but the application is not limited thereto. Below, the method for displaying contact information is described in detail with reference to various components of the first electronic apparatus 100.

In step S510, when a call between the first electronic apparatus 100 and the second electronic apparatus is not finished by being hanged up, the processing unit 130 could generate a notification, wherein the notification is configured for preventing the first electronic apparatus and the second electronic apparatus from simultaneously calling each other. In detail, the processing unit 130 could determine whether the button configured for hanging up the call is pressed before the call disconnects. If no, the processing unit 130 would know that the call between the first electronic apparatus 100 and the second electronic apparatus is accidentally disconnected. Under this situation, the processing unit 130 could use the notification to suggest the user of the first electronic apparatus 100 proactively establish the other call, or waiting for the second electronic apparatus to call back. As a result, the situation that the first electronic apparatus 100 and the second electronic apparatus simultaneously trying to call each other could be effectively avoided. Details of the step S510 could be referred to the following FIG. 6.

FIG. 6 is a method for handling call lost according to FIG. 5. In the present example, the steps illustrated in FIG. 6 could be applicable to the first electronic apparatus 100 of FIG. 1, but the application is not limited thereto. Below, the method for displaying contact information is described in detail with reference to various components of the first electronic apparatus 100.

In step S610, the processing unit 130 would determine whether the call is established by the first electronic apparatus 100. If yes, the method proceeds to step S620, otherwise, the method proceeds to step S640.

In step S620, the processing unit 130 may generate a first notification for suggesting establish another call with the second electronic apparatus. That is, since the disconnected call was originally established by the first electronic apparatus 100, it is reasonable for the processing unit 130 to suggest the user of the first electronic apparatus 100 proactively establish another call with the second electronic apparatus. In addition, after generating the first notification, in step S630, the processing unit 130 could also automatically establish the other call with the second electronic apparatus. In another example, a button is also displayed along with the first notification, and after the button is activated, the other call with the second electronic apparatus is established.

In step S640, the processing unit 130 may generate a second notification for suggesting wait for the second electronic apparatus to establish the other call. That is, since the disconnected call was originally established by the second electronic apparatus, it is reasonable for the processing unit 130 to suggest the user of the first electronic apparatus 100 passively wait for the other call from the second electronic apparatus.

However, in some examples, the user of the first electronic apparatus 100 may still accidentally initiate the other call. Hence, in step S650, if the processing unit 130 detects the first electronic apparatus 100 initiating the other call with the second electronic apparatus, the processing unit 130 could hang up the other call established by the first electronic apparatus 100.

To sum up, the examples of the present application provide a method for displaying contact information and an electronic apparatus using the same method. The proposed method for displaying contact information could display some indicators, which represent the voice availability of the contact, while the user is inputting (i.e., dialing) numbers or characters in the dialer of the electronic apparatus. Therefore, the user could understand that whether the contact is currently available for receiving calls according to the indicators. Since most of the users are more used to directly use the dialer to find the contact they want to call, displaying the indicators in the dialer along with the inputted numbers of the user would be much more practical, useful, and instinct for the users to understand whether the contacts are available to be called.

Furthermore, the present application further proposes a method for handling a lost call. The method for handling a lost call could generate a notification when the call between the first electronic apparatus and the second electronic apparatus is accidentally finished. With the notification, the users of the first and second electronic apparatus could accordingly determine whether to proactively establish a new call or passively wait for the new call. Therefore, the situation that the users of the first and second electronic apparatus simultaneously trying to call each other could be effectively avoided with this method.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method of handling a lost call, applicable to a first electronic apparatus, comprising:

only if a call between the first electronic apparatus and a second electronic apparatus is finished, determining, by the first electronic apparatus, whether the call is finished by being hung up;

in response to determining the call is not finished by being hung up, determining, by the first electronic apparatus, whether the finished call was originally established by the first electronic apparatus; and in response to determining the finished call was originally established by the first electronic apparatus, generating, by the first electronic apparatus, a first notification for suggesting establishing another call with the second electronic apparatus by the first electronic apparatus; and in response to determining the finished call was not originally established by the first electronic apparatus, generating, by the first electronic apparatus, a second notification for suggesting waiting for the second electronic apparatus to establish the another call, wherein the first and second notifications are configured for preventing the first electronic apparatus and the second electronic apparatus from simultaneously calling each other.

2. The method as claimed in claim 1, wherein generating the first notification for suggesting establishing another call with the second electronic apparatus comprising:
  displaying a button for establishing the other call with the second electronic apparatus; and
  the method further comprising:
  determining whether the button is activated; and
  after the button is activated, establishing the other call with the second electronic apparatus.

3. The method as claimed in claim 1, wherein before generating the second notification in the first electronic apparatus for suggesting waiting for the second electronic apparatus to establish the other call, further comprising:
  detecting whether the first electronic apparatus initiating the other call with the second electronic apparatus;
  in response to detecting the first electronic apparatus initiating the other call with the second electronic apparatus, hanging up the other call.

4. A mobile electronic apparatus, comprising:
  a storage unit, storing a plurality of program codes;
  a display unit; and
  a processing unit coupled to the storage unit and the display unit, and configured for accessing the program codes to execute the following steps:
  only if a call between the first electronic apparatus and a second electronic apparatus is finished, determining, by the first electronic apparatus, whether the call is finished by being hung up;
  in response to determining the call is not finished by being hung up, determining, by the first electronic apparatus, whether the finished call was originally established by the first electronic apparatus; and
  in response to determining the finished call was originally established by the first electronic apparatus, generating, by the first electronic apparatus, a first notification for suggesting establishing another call with the second electronic apparatus by the first electronic apparatus and controlling the display unit to display the first notification; and
  in response to determining the finished call was not originally established by the first electronic apparatus, generating, by the first electronic apparatus, a second notification for suggesting waiting for the second electronic apparatus to establish the another call and controlling the display unit to display the second notification, wherein the first and second notifications are configured for preventing the first electronic apparatus and the second electronic apparatus from simultaneously calling each other.

5. The mobile electronic apparatus as claimed in claim 4, wherein generating the first notification for suggesting establishing another call with the second electronic apparatus comprising:
  displaying a button for establishing the other call with the second electronic apparatus; and
  the method further comprising:
  determining whether the button is activated; and
  after the button is activated, establishing the other call with the second electronic apparatus.

6. The mobile electronic apparatus as claimed in claim 4, wherein before generating the second notification in the first electronic apparatus for suggesting waiting for the second electronic apparatus to establish the other call, further comprising:
  detecting whether the first electronic apparatus initiating the other call with the second electronic apparatus;
  in response to detecting the first electronic apparatus initiating the other call with the second electronic apparatus, hanging up the other call.

7. A non-transitory computer readable medium for recording a program configured to be loaded by a first electronic apparatus to execute steps of:
  only if a call between the first electronic apparatus and a second electronic apparatus is finished, determining, by the first electronic apparatus, whether the call is finished by being hung up;
  in response to determining the call is not finished by being hung up, determining, by the first electronic apparatus, whether the finished call was originally established by the first electronic apparatus; and
  in response to determining the finished call was originally established by the first electronic apparatus, generating, by the first electronic apparatus, a first notification for suggesting establishing another call with the second electronic apparatus by the first electronic apparatus; and
  in response to determining the finished call was not originally established by the first electronic apparatus, generating, by the first electronic apparatus, a second notification for suggesting waiting for the second electronic apparatus to establish the another call, wherein the first and second notifications are configured for preventing the first electronic apparatus and the second electronic apparatus from simultaneously calling each other.

8. The non-transitory computer-readable medium as claimed in claim 7, wherein generating the first notification for suggesting establishing another call with the second electronic apparatus comprising:
  displaying a button for establishing the other call with the second electronic apparatus;
  determining whether the button is activated; and
  after the button is activated, establishing the other call with the second electronic apparatus.

9. The non-transitory computer-readable medium as claimed in claim 7, wherein before generating the second notification in the first electronic apparatus for suggesting waiting for the second electronic apparatus to establish the other call, further comprising:
  detecting whether the first electronic apparatus initiating the other call with the second electronic apparatus;

in response to detecting the first electronic apparatus initiating the other call with the second electronic apparatus, hanging up the other call.

\* \* \* \* \*